US011301819B2

(12) United States Patent
Liu et al.

(10) Patent No.: US 11,301,819 B2
(45) Date of Patent: Apr. 12, 2022

(54) OPPORTUNISTIC MULTI-PARTY REMINDERS BASED ON SENSORY DATA

(71) Applicant: International Business Machines Corporation, Armonk, NY (US)

(72) Inventors: Su Liu, Austin, TX (US); Eric Rozner, Austin, TX (US); Inseok Hwang, Austin, TX (US); Jinho Lee, Travis, TX (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 16/125,227

(22) Filed: Sep. 7, 2018

(65) Prior Publication Data

US 2020/0082353 A1 Mar. 12, 2020

(51) Int. Cl.
*G06Q 10/10* (2012.01)
*G06N 5/04* (2006.01)
*G06Q 10/06* (2012.01)
*G06N 20/00* (2019.01)

(52) U.S. Cl.
CPC ......... *G06Q 10/1097* (2013.01); *G06N 5/046* (2013.01); *G06N 20/00* (2019.01); *G06Q 10/06311* (2013.01)

(58) Field of Classification Search
CPC ......... G06Q 10/1097; G06Q 10/06311; G06Q 10/063114; G06Q 10/10; G06Q 10/06398; G06N 20/00; G06N 3/006; G06N 5/046
See application file for complete search history.

(56) References Cited

U.S. PATENT DOCUMENTS

| | | | |
|---|---|---|---|
| 7,395,221 B2 | 7/2008 | Doss et al. | |
| 7,541,940 B2 | 6/2009 | Upton | |
| 8,145,274 B2 | 3/2012 | Gandhi et al. | |
| 8,270,954 B1 | 9/2012 | Breau et al. | |
| 8,825,511 B2 | 9/2014 | Hamilton et al. | |
| 8,938,394 B1 | 1/2015 | Faaborg et al. | |
| 9,111,233 B2 | 8/2015 | Elumalai et al. | |
| 9,268,772 B2 | 2/2016 | Xie | |
| 9,349,368 B1 | 5/2016 | Lebeau et al. | |
| 9,513,867 B1 | 12/2016 | Tokunaga | |
| 2004/0003042 A1* | 1/2004 | Horvitz | G06Q 10/109 709/204 |

(Continued)

OTHER PUBLICATIONS

B. Kang et al., Zaturi: Blending Hours Spent at Work and Hours Devoted to Children:, CSCW 2017, Feb. 25-Mar. 1, 2017, pp. 9-12.

*Primary Examiner* — Rutao Wu
*Assistant Examiner* — Stephen S Swartz
(74) *Attorney, Agent, or Firm* — Kunzler Bean & Adamson

(57) ABSTRACT

Methods and systems for opportunistic multi-party reminders based on sensory data are provided. A system for providing opportunistic multi-party reminders based on sensory data may include a coordination module that coordinates user schedules for a plurality of parties. Also, the system may include a time prediction module that characterizes one or more times in a user schedule in response to gathered context information for one or more parties in the plurality of parties. Further, the system may include a task completion module that identifies at least one time in the one or more times in a user schedule for completing a task in response to the characterization of the one or more times.

20 Claims, 9 Drawing Sheets

(56) References Cited

U.S. PATENT DOCUMENTS

| | | | |
|---|---|---|---|
| 2005/0084082 A1* | 4/2005 | Horvitz | H04M 3/436 379/114.06 |
| 2006/0010206 A1* | 1/2006 | Apacible | G06F 15/163 709/205 |
| 2007/0118415 A1 | 5/2007 | Chen et al. | |
| 2007/0162907 A1* | 7/2007 | Herlocker | G06Q 10/10 718/100 |
| 2008/0101584 A1* | 5/2008 | Gray | H04M 3/436 379/221.08 |
| 2010/0004922 A1 | 1/2010 | Bradley et al. | |
| 2010/0159909 A1 | 6/2010 | Stifelman | |
| 2011/0112837 A1* | 5/2011 | Kurki-Suonio | G10L 15/22 704/235 |
| 2012/0309363 A1 | 12/2012 | Gruber et al. | |
| 2013/0222115 A1* | 8/2013 | Davoodi | H04Q 9/00 340/10.1 |
| 2013/0311997 A1* | 11/2013 | Gruber | G06Q 10/10 718/102 |
| 2014/0129942 A1* | 5/2014 | Rathod | H04N 21/44222 715/720 |
| 2014/0135036 A1 | 5/2014 | Bonanni et al. | |
| 2015/0200892 A1 | 7/2015 | Ramachandran | |
| 2015/0269533 A1* | 9/2015 | Garg | G06Q 10/1097 705/7.21 |
| 2016/0062605 A1 | 3/2016 | Agarwal et al. | |
| 2016/0148158 A1* | 5/2016 | Marth | G06Q 30/0243 705/14.72 |
| 2016/0165047 A1* | 6/2016 | Gray | H04M 7/006 379/201.03 |
| 2017/0004396 A1 | 1/2017 | Ghotbi et al. | |
| 2017/0039503 A1* | 2/2017 | Jones | G06Q 10/06398 |
| 2017/0116552 A1* | 4/2017 | Deodhar | G06Q 10/06316 |
| 2017/0148302 A1 | 5/2017 | Liu et al. | |
| 2017/0178086 A1 | 6/2017 | Dave et al. | |
| 2017/0300364 A1* | 10/2017 | Liu | H04W 4/029 |
| 2017/0357529 A1* | 12/2017 | Venkatraman | H04L 67/22 |
| 2018/0032944 A1* | 2/2018 | Sarvana | G06Q 10/063114 |
| 2018/0150786 A1* | 5/2018 | Debnath | G06Q 10/063114 |
| 2018/0189743 A1* | 7/2018 | Balasubramanian | G06Q 10/1095 |
| 2018/0268337 A1* | 9/2018 | Miller | G06Q 10/063114 |
| 2019/0095846 A1* | 3/2019 | Gupta | G06Q 10/1097 |
| 2019/0129749 A1* | 5/2019 | White | G06Q 10/109 |

* cited by examiner

OPPORTUNISTIC MULTI-PARTY REMINDERS BASED ON SENSORY DATA

FIELD

This invention relates to scheduling and task management and more particularly relates to methods and systems for opportunistic multi-party reminders based on sensory data.

BACKGROUND

Many people use to-do lists and calendars to manage their lives and keep track of important dates and appointments. Today, electronic devices are frequently used to maintain to-do lists and calendars and function as an aid for other task management activities. For example, many people use smart phones to keep track of appointments and schedule daily reminders for certain tasks. Further, electronic devices may also help a user to accomplish goals in their desire for self-improvement.

SUMMARY

Methods and systems for opportunistic multi-party reminders based on sensory data are provided. A system for providing opportunistic multi-party reminders based on sensory data may include a coordination module that coordinates user schedules for a plurality of parties. Also, the system may include a time prediction module that characterizes one or more times in a user schedule in response to gathered context information for one or more parties in the plurality of parties. Further, the system may include a task completion module that identifies at least one time in the one or more times in a user schedule for completing a task in response to the characterization of the one or more times.

In some embodiments, the system may include an information transmission module that controls the transmission of the user schedules, the context information, and the one or more times. Further, the information transmission module transmits information from a user device to at least one of a central scheduling store; and a peer device. Also, the time prediction module may include a sensor module that gathers context information from sensing environmental information associated with the party in the plurality of parties. Additionally, the task completion module may identify the at least one time for completing the task by monitoring party activities and the context information and determining that the party activities and the context information indicate the at least one time for completing the task.

In further embodiments, the task completion module may identify the at least one time for completing the task by identifying the task, identifying one or more parties associated with the task, identify conditions related to the completion of the task, monitor the user schedules associated with the one or more parties, and identify the at least one time in the user schedules where the context information indicates that the conditions related to the completion of the task are likely to exist. Further, identifying the task may include at least one of determining the duration of the task, and classifying the task based on previously completed tasks.

In additional embodiments, identifying the one or more parties associated with the task may include at least one of determining a party identifier in a task description, when the party identifier applies to multiple parties, determining the party based on other recorded task information. Further, identifying the conditions includes identifying previously completed tasks that are similar to the task, analyzing sensory data that is associated with the previously completed tasks, and identifying the conditions that are associated with the sensory data.

A method for providing opportunistic multi-party reminders based on sensory data may include coordinating user schedules for a plurality of parties. The method also may include characterizing one or more times in a user schedule in response to gathered context information for one or more parties in the plurality of parties. Further, the method may include identifying at least one time in the one or more times in a user schedule for completing a task in response to the characterization of the one or more times.

In some embodiments, the method may include controlling the transmission of the user schedules, the context information, and the one or more times. Also, the method may include transmitting information from a user device to at least one of a central scheduling store and a peer device. Further, the method may include gathering context information from sensed environmental information associated with a party in the plurality of parties. Additionally, identifying the at least one time for completing the task may include monitoring party activities and the context information and determining that the party activities and the context information indicate the at least one time for completing the task.

In additional embodiments, identifying the at least one time for completing the task may include identifying the task, identifying one or more parties associated with the task, identify conditions related to the completion of the task, monitor the user schedules associated with the one or more parties, and identify the at least one time in the user schedules where the context information indicates that the conditions related to the completion of the task are likely to exist. Further, identifying the task may include at least one of determining the duration of the task, classifying the task based on previously completed tasks.

In further embodiments, identifying the one or more parties associated with the task may include at least one of determining a party identifier in a task description, and when the party identifier applies to multiple parties, determining the party based on other recorded task information. Also, identifying the conditions may include identifying previously completed tasks that are similar to the task, analyzing sensory data that is associated with the previously completed tasks, and identifying the conditions that are associated with the sensory data.

A computer program product may include a computer-readable storage medium including program instructions embodied for providing opportunistic multi-party reminders based on sensory data, the program instructions may be executable by a processor to cause the processor to coordinate user schedules for a plurality of parties. Also, the program instructions may cause the processor to characterize one or more times in a user schedule in response to gathered context information for one or more parties in the plurality of parties. Further, the program instructions may cause the processor to identify at least one time in the one or more times in a user schedule for completing a task in response to the characterization of the one or more times.

In some embodiments, the program instructions may cause the processor to control the transmission of the user schedules, the context information, and the one or more times. Further, the program instructions cause the processor to gather context information from sensing environmental information associated with a party in the plurality of parties. Additionally, the program instructions may cause the processor to identify the at least one time for completing the task by identifying the task, identifying one or more parties associated with the task, identify conditions related to the completion of the task, monitor the user schedules associated with the one or more parties, and identify the at least one time in the user schedules where the context information indicates that the conditions related to the completion of the task are likely to exist.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
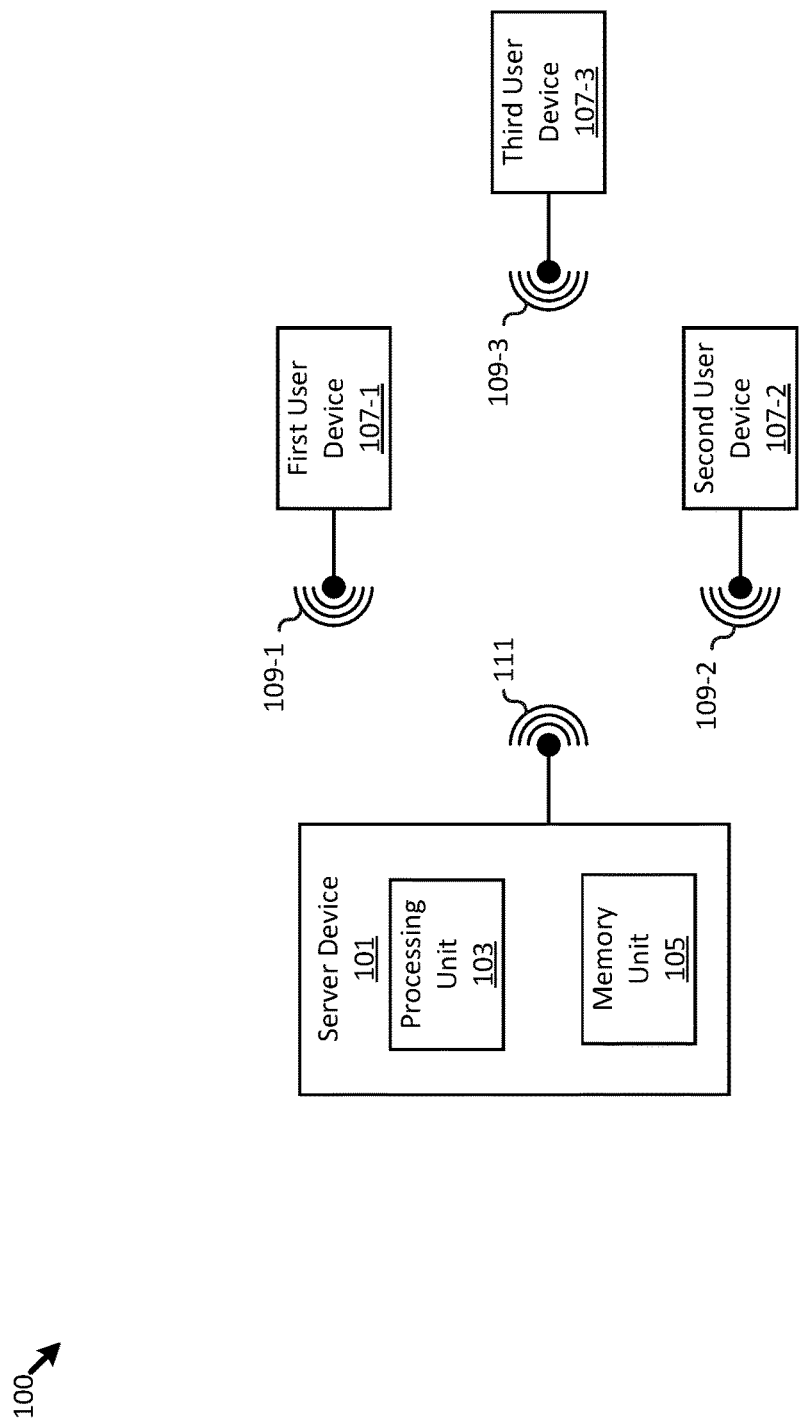
FIG. 1 is a block diagram of one embodiment of a computing system for scheduling reminders.

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

With reference now to the figures, FIG. 1 is a block diagram of one embodiment of a computing system 100 for scheduling reminders. As illustrated, the computing system 100 may include a plurality of user devices that are used by a party. As used herein, a party may refer to an individual, a controlling computer device, or other entity capable of or associated with an entity capable of controlling an electronic device. For example, the computing system 100 may include a first user device 107-1, a second user device 107-2, and a third user device 107-3 (user devices are referred to generally and collectively as user devices 107). As used herein, a user device 107 may refer to an electronic device that is controllable by a party. For instance, a user device 107 may be a personal electronic device, a smart watch, a laptop, a desktop, a smart TV, a smart appliance, automobile electronics, or other electronic device that may be controlled by a party. Further, a user device 107 may be controlled by a processor that may execute computer readable instructions.

In certain embodiments, a person may exploit the capabilities of a particular user device 107 to manage tasks, such as keep to-do lists, provide reminders, and perform other scheduling and task management activities. As used herein, a task may refer to a piece of work to be done or undertaken by a party. For example, a first party of the first user device 107-1 may set up a reminder to call another individual at a particular time. When the particular time arrives, the first user device 107-1 may provide a notification or other reminder to help the first party remember to call the other individual. Also, a second party may maintain a to-do list on the second user device 107-2. When the second party is looking for something to accomplish, the second party may review the to-do list maintained on the second user device 107-2 and select a task to perform. Upon completion of the task, the second party may indicate to the second user device 107-2 that the selected task has been completed and can be deactivated or removed from the to-do list.

In some embodiments, the user device 107 may be capable of communicating with other electronic devices. For example, the first user device 107-1 may communicate with other electronic devices through a first wireless transmitter 109-1, the second user device 107-2 may communicate with other electronic devices through a second wireless transmitter 109-2, and the third user device 107-3 may communicate with other electronic devices through a third wireless transmitter 109-3. As used herein, the first wireless transmitter 109-1, the second wireless transmitter 109-2, and the third wireless transmitter 109-3 may be referred to generally and collectively as wireless transmitters 109. The wireless transmitters 109 may be capable of transmitting wireless signals to one or more other electronic devices. For example, the wireless transmitters 109 may communicate with other electronic devices by transmitting signals according to WiMAX, Wi-Fi, LTE, Bluetooth, BTLE, Zigbee, or other communication standard. In an alternative embodiment, the user devices 107 may communicate with other electronic devices through a wired connection.

In further embodiments, multiple user devices 107 may communicate with a server device 101, where the server device 101 may function as a repository and/or manager of tasks and reminders stored on a connected user device 107. For example, the first user device 107-1 may be connected to the server device 101 through a wireless transmitter 111, where the wireless transmitter 111 may communicate in a similar manner to the wireless transmitters 109 described above. In certain embodiments, the server device 101 may include a processing unit 103 and a memory unit 105. The processing unit 103 may perform tasks as instructed by computer readable instructions. Further, the processing unit 103 may control the operation of the server device 101 and control the communication of information through the wireless transmitter 111.

In certain embodiments, the memory unit 105 may be any suitable type of storage device or cluster of storage devices that are known or developed in the future that can store computer-usable data. In various embodiments, the memory unit 105 may include one or more non-transitory computer-usable mediums (e.g., readable, writable, etc.), which may include any non-transitory apparatus or device that can contain, store, communicate, propagate, and/or transport instructions, data, computer programs, software, code, routines, etc., for processing by or in connection with the computing system 100.

In certain embodiments, the memory unit 105 may be implemented as a direct-access storage devices (DASD). The memory unit 105, in further embodiments, may include non-transitory memory such as, for example, flash memory (e.g., a solid-state device (SSD) or other non-volatile storage devices that stores persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein. In some embodiments, the memory unit 105 may be a cluster of separate storage devices that are configured to store data.

In various embodiments, the memory unit 105 may include non-volatile/persistent hardware and/or software configured to perform long-term data storage operations, including, but not limited to, data archiving, data backup, data mirroring, replicating data, etc. For instance, the memory unit 105 may include non-volatile and/or persistent hardware and/or software to perform long-term data storage operations, which may include write operations, read operations, read-write operations, etc., among other operations.

In certain embodiments, the memory unit 105 may function as a central scheduling store that maintains a record of tasks to be completed that have been scheduled by multiple parties on multiple user devices 107. When the time comes for the completion of a particular task, the processing unit 103 may direct the server device 101 to send a notification to the user device 107 through a respective wireless transmitter 109. For example, a task stored on the memory unit 105 may be associated with the third user device 107-3. When the scheduled time to complete the task arrives, the processing unit 13 may direct the server device 101 to send a notification to the third user device 107-3 through the wireless transmitter 111. The third user device 107-3 may receive the notification through the third wireless transmitter 109-3. Upon reception of the notification, the user device 107 may display the notification to the party. When a party completes the task, the party may indicate that the task has been completed on third user device 107-3. The third user device 107-3 may then send an indication to the server device 101 that the task has been completed. Upon receiving the indication, the server device 101 may store the task as a completed task on the central scheduling store on the memory unit 105 or delete the task from the central scheduling store on the memory unit 105.

In certain embodiments, a task to be completed may involve multiple parties, where the different parties are operating separate user devices 107. For example, a task may be a first party calling a second party, where the first party is associated with the first user device 107-1 and the second party is associated with the second user device 107-2. While the server device 101 may keep a record of the task involving both parties. It may store the information as a static event. For instance, if the first party sets a task to call the second party, the first party may set a time to be reminded to call the second party. Further, the tasks are set as directed by a single or primary party. For example, since the first party is setting the task that involves both the first party and the second party, the first party may determine the time at which the first user device 107-1 will remind the first party to attempt to call the second party. However, the reminder may be provided to the first party without consideration of the schedule of the second party. Also, as the reminder may be set by a party before the party can fully comprehend other events that may arise around the reminder time, it may be difficult for the party to accomplish the task at the predetermined reminder time. Accordingly, tasks, and in particular, tasks involving multiple parties, are frequently ignored because the preset reminder times frequently are not convenient for one or more parties to accomplish the task.

Figure 2:
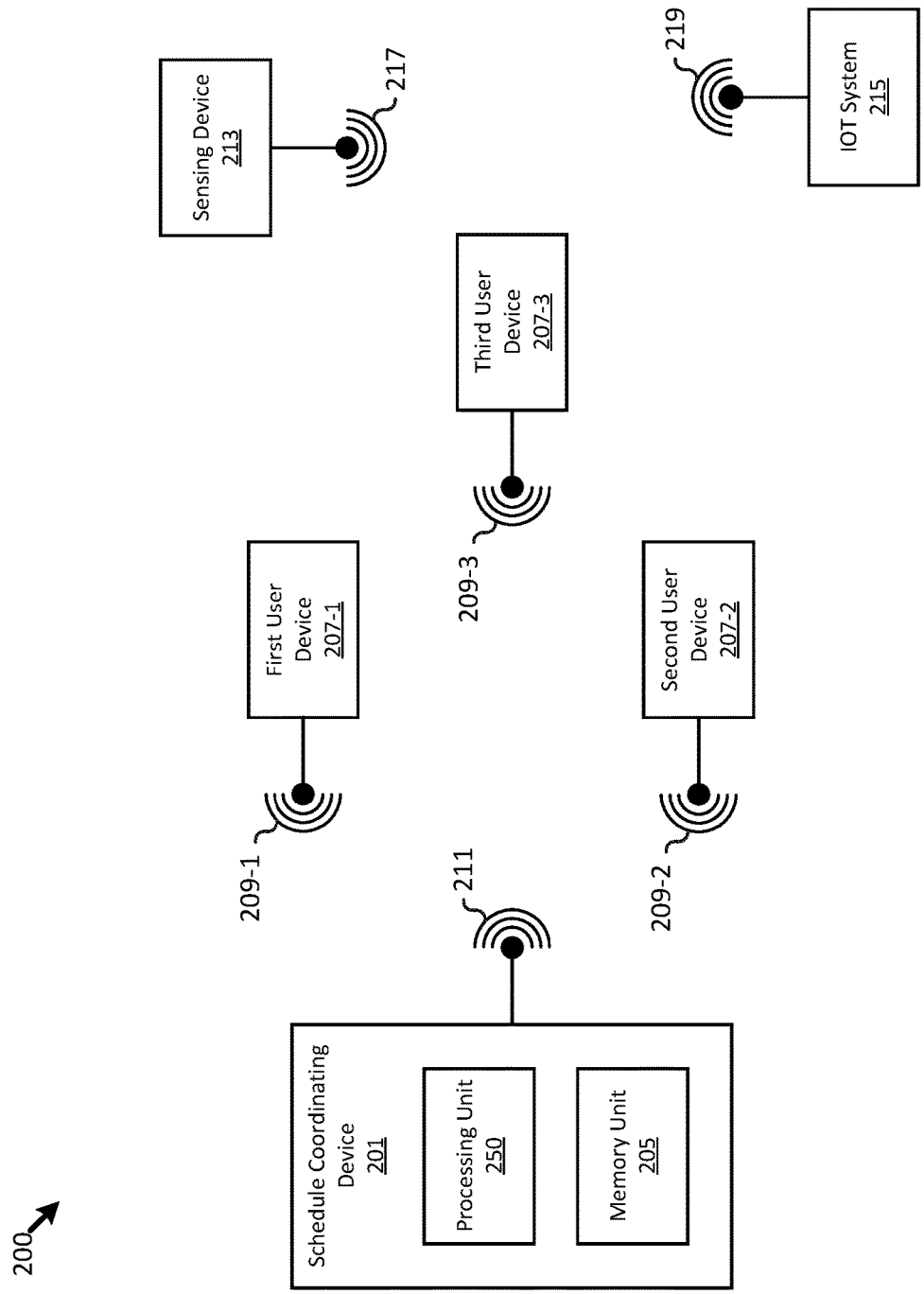
FIG. 2 is a block diagram illustrating one embodiment of a computing system for providing opportunistic multi-party reminders based on sensory data.

FIG. 2 is a block diagram of one embodiment of a computing system 200 for providing and managing opportunistic multi-party reminders based on sensory data. As illustrated in FIG. 2, the computing system 200 may include a first user device 207-1, a second user device 207-2, and a third user device 207-3. The first user device 207-1, the second user device 207-2, and the third user device 207-3 are referred to herein collectively and generally as user device(s) 207. As used herein, the first user device 207-1, the second user device 207-2, and a third user device 207-3 may be similar in some respects to the first user device 107-1, the second user device 107-2, and the third user device 107-3. In particular, the user devices 207 communicate through the corresponding wireless transmitters 209 and also provide an interface for a party to manage schedules and tasks. However, the user devices 207 differ from the user devices 107 in that the user devices 207 provide opportunistic reminders to the parties of the various user devices 207. Further, the user devices 207 may provide the opportunistic reminders based on sensory data.

In certain embodiments, the computing system 200 may include a schedule coordinating device 201, where the schedule coordinating device 201 may function as a repository and/or manager of tasks and reminders stored on a connected user device 207. For example, the first user device 107-1 may be connected to the schedule coordinating device 201 through a wireless transmitter 211, where the wireless transmitter 211 may function similarly to the wireless transmitter 111 described above in FIG. 1. Further, the schedule coordinating device 201 may include a processing unit 250 and a memory unit 105. The processing unit 250 may perform tasks as instructed by computer readable instructions. Further, the processing unit 250 may control the operation of the schedule coordinating device 201 and control the communication of information through the wireless transmitter 211. Alternatively, the processing unit 250 may also be one or more processing units located on the separate user devices 207.

In certain embodiments, the memory unit 205 may be any suitable type of storage device or cluster of storage devices that are known or developed in the future that can store computer-usable data and that is substantially similar to the memory unit 105 described above with respect to FIG. 1. In a similar manner to that described above with respect to the memory unit 105 in FIG. 1, the memory unit 205 may function as a central scheduling store that maintains a record of tasks to be completed that have been scheduled by multiple parties on multiple user devices 207. However, in contrast to the processing unit 103 and the memory unit 105, the processing unit 250 may use the information in the memory unit 205 to opportunistically provide multi-party reminders based on sensory data.

In some embodiments, the computing system 200 may opportunistically provide reminders to parties through the user devices 207. To provide the opportunistic reminder, the computing system 200 may identify blocks of non-scheduled time (time on a user calendar that is not allocated for the performance of other tasks). When the computing system 200 identifies the blocks of non-scheduled time, the computing system 200 may estimate an expected duration for the task. After the computing system 200 estimates the expected duration for the task, the computing system 200 may then identify the blocks of non-scheduled time that have a duration greater than or equal to the expected duration for the task. When the computing system 200 identifies a block having a sufficient duration, the computing system 200 may schedule a reminder that will be provided to a party when the appointed time arrives.

In certain embodiments, the schedule coordinating device 201 may schedule the opportunistic reminder. For example, a first party of the first user device 207-1 may create a task. The first user device 207-1 may then communicate the task to the schedule coordinating device 201. The schedule coordinating device 201 may then identify the unscheduled blocks of time of sufficient duration and schedule the opportunistic reminder. Alternatively, a user device 207 may schedule the opportunistic reminder. For example, a second party of the second user device 207-2 may create a task on the second user device 207-2. The second user device 207-2 may then identify the unscheduled blocks of time of sufficient duration and schedule the opportunistic reminder.

In further embodiments, the computing system 200 may provide opportunistic reminders for multiple parties. To provide opportunistic reminders for multiple parties, the computing system 200 may identify blocks of non-scheduled time that are available for the multiple parties associated with a particular task. The computing system 200 may then predict which blocks of nonscheduled time will provide the multiple parties with a likely opportunity to complete the task. For example, the computing system 200 may identify the parties associated with a task. The computing system 200 may then identify the nonscheduled blocks of time in which the task may be completed. Additionally, the computing system 200 may identify the nonscheduled blocks of time that are the same for the multiple parties involved with the task. Upon identifying the similar nonscheduled blocks of time, the computing system 200 may select a nonscheduled block of time when the computing system 200 may provide a reminder for the task to the multiple parties associated with the task.

In certain embodiments, the schedule coordinating device 201 creates a reminder for a task for the multiple parties associated with the task. For example, a second party on the second user device 207-2 may create a task that involves the third party and the third user device 207-3. Upon scheduling the task on the second user device 207-2, the second user device 207-2 may communicate the task to the schedule coordinating device 201. The schedule coordinating device 201 may then identify the nonscheduled blocks of time for both the second party and the third party based on the data stored in the central scheduling store on the memory unit 205, data stored on the second user device 207-2, and data stored on the third user device 207-3. When the schedule coordinating device 201 identifies the nonscheduled blocks of time, the schedule coordinating device 201 may then select a nonscheduled block of time that is available to both the second party and the third party. The schedule coordinating device 201 may then provide the reminder to both the second user device 207-2 and the third user device 207-3 at the selected time.

In an alternative embodiment, the user devices 207 associated with the parties involved in the task may communicate with one another to identify a nonscheduled block of time in which both parties may accomplish the particular task. For example, a first party using the first user device 207-1 may attempt to schedule a task involving the second party and the second user device 207-2. When the first party records the task on the first user device 207-1, the first user device 207-1 may identify both the nonscheduled time blocks and the different parties associated with the task, in this case the second party. The first user device 207-1 may then communicate the task and the nonscheduled time blocks associated with the task to the second user device 207-2. Upon receiving the task, the second user device 207-2 may identify nonscheduled time blocks in the schedule of the second party that are available to complete the task. The first user device 207-1 and the second user device 207-2 may then communicate with one another to identify a nonscheduled time block in which both the first party and the second party are likely to complete the task. When both the first user device 207-1 and the second user device 207-2 select a nonscheduled time block for the task, both the first user device 207-1 and the second user device 207-2 may schedule reminders to notify the first party and the second party to complete the task at the identified time.

In additional embodiments, the computing system 200 may provide the opportunistic reminders based on sensory data acquired by sensors on the user devices 207, sensors in the computing system 200, or context data in the task reminder or gathered through the completion of other similar tasks. As used herein, sensory data, or context information, may be used by the computing system 200 to understand the context and conditions that may potentially exist that are conducive to the completion of a task. As stated, the conditions that are conducive to the completion of a task may be explicitly stated in a task set up by a party. Alternatively, conditions that are conducive to the completion of a task may also be determined by the computing system 200 based on monitored conditions that were present when a similar task or a previous instance of the task was completed on a previous occasion. When the computing system 200 determines that conditions are conducive to the completion of a task, the computing system 200 may provide a reminder to the parties associated with the task that the task is ready to be completed.

In some embodiments, the user devices 207 may provide sensory data that can be used by the computing system 200 to identify conditions conducive to the completion of a task. For example, a user device 207 may be a smart phone that is capable of providing location information, time, application usage, biometric measurements, current user activities, among other types of data. When a task is completed, the user device 207 may identify conditions that were present at the time the task was completed based on the information gathered from the various sources of data. The user device 207, the schedule coordinating device 201, and other user devices 207 involved in the task may access information from previous completed tasks that are similar to the presently scheduled task or previous instances of the presently scheduled task. Based on the gathered information, the various devices in the computing system 200 that are associated with the task to be completed may monitor the conditions associated with the parties involved in the task to determine when present conditions are conducive to the completion of the task. As stated above, the computing system 200 may provide a reminder to the parties involved in the task when present conditions become conducive to the completion of the task.

Further, computing system 200 may include various sensors that may monitor conditions in addition to the user devices 207 in the schedule coordinating device 201. In certain embodiments, the computing system 200 may include a sensing device 213 and an Internet of things (TOT) system 215. As used herein, a sensing device 213 may refer to a device that gathers information about its environment. For example, a sensing device 213 may be a thermostat, a kitchen appliance, a doorbell, a security camera, an automobile, a sprinkler system, a television, a radio, or other device capable of gathering information about an environment or other information that may provide information related to the present activities of a particular party.

Also, as used herein, the TOT system 215 may refer to a hub for communicating with multiple sensing devices 213 to gather the information for use by the computing system 210. For example, the TOT system 215 may be a device that communicates with the different sensing devices 213 and gathers information about the environments of the different sensing devices 213 and controls the operation of the different sensing device 213. For example, the TOT system 215 may be a Google Home device, an Amazon Alexa system, a Nest system, and the like. In certain applications, the TOT system 215 may be implemented on one or more of the user devices 207. In certain embodiments, the computing system 200 may use the information gathered about the environment from the sensing devices 213 and the TOT system 215 to determine when conditions within the environment of the party are conducive to the completion of a task. When the conducive conditions arise, the computing system 200 may provide a reminder to the parties associated with the task.

In additional embodiments, computing system 200 may identify conditions conducive to the completion of the task based on information within the task. For example, the computing system 200 may identify the different parties involved in the task and then gather the contact information for the different parties. Also, the computing system 200 may identify locations associated with the task and use the location information to determine when a party is present at the locations associated with the task. Other information that can be gathered from a task may include explicitly mention times in which a party would like to complete a task, related tasks and activities, and the like. The computing system 200 may use the information within the task to determine when conditions are conducive to the completion of a task and provide a reminder to the parties associated with the task when the conducive conditions arise.

As described above, the computing system 200 may be able to provide opportunistic reminders for multiple parties using sensory data. Accordingly, the computing system 200 may be able to use the sensory data and data about the multiple parties to provide reminders when a task is more likely to be completed. By providing reminders that are more likely to motivate a party to complete a task, a party may more efficiently complete his tasks and achieve his personal development goals.

Figure 3:
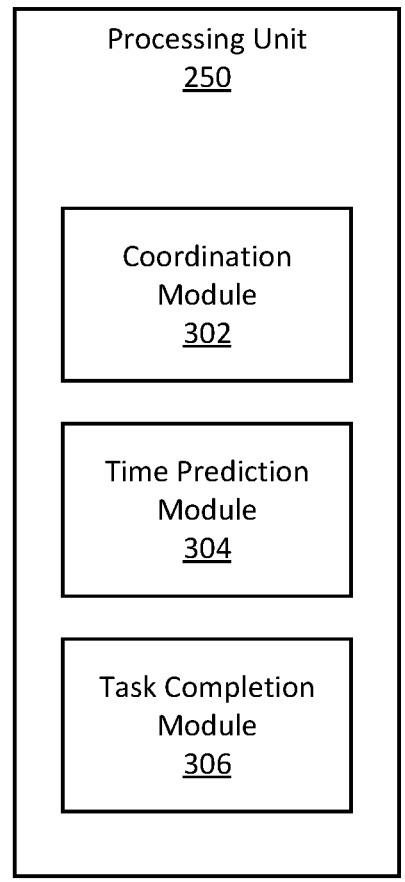
FIG. 3 is a block diagram illustrating an embodiment of a processor configured to provide opportunistic multi-party reminders based on sensory data.

FIG. 3 is a block diagram illustrating an embodiment of a processing unit 250 for providing opportunistic multi-party reminders based on sensory data. In certain embodiments, as used herein, the processing unit 250 may be a general-purpose computer, special-purpose computer, multiple processors, or other programmable data processing apparatus. In some embodiments, the processing unit 250 may be one or more processors on the schedule coordinating device 201 and the user devices 207 capable of directing the storage of data on storage devices such as those described above in connection with FIG. 2 in the depicted embodiment. The processing unit 250 may include a coordination module 302, a time prediction module 304, and a task completion module 306. As described herein, the coordination module 302 may coordinate user schedules for a plurality of parties. Further, as described herein, the time prediction module 304 may characterize one or more times in a user schedule in response to gathered context information for one or more parties in the plurality of parties. Also, as described herein the task completion module 306 may identify at least one time in the one or more times in the user schedule for completing a task in response to the characterization of the one or more times.

In certain embodiments, the coordination module 302 may coordinate user schedules for multiple parties associated with the user devices 207. As used herein, a user schedule may refer to a record that indicates what a party intends to do in the future. A user schedule may include such information as tasks, goals, events, people one might participate with when performing an activity, locations, and the like. The coordination module 302 may associate the items of information on the user schedule with times at which the item of information will occur or may be completed. Frequently, an item of information may involve one or more parties and the events on one party's schedule may conflict with the events on another party's schedule. The coordination module 302 may coordinate the user schedules for one or more parties to resolve the conflicts such that events involving multiple parties may be completed.

In some embodiments, the coordination module 302 may store schedule information for multiple parties on a memory unit 205 located on the schedule coordinating device 201. Further, the coordination module 302, executing on the schedule coordinating device 201, may use the information in the memory unit 205 to coordinate the user schedules for the multiple parties. Alternatively, the coordination module 302 may be executed by multiple user devices 207 associated with the particular task to be completed. The multiple user devices 207 may communicate with one another as the coordination module 302 identifies and coordinates the user schedules for the one or more parties associated with the separate user devices 207.

In additional embodiments, the time prediction module 304 may characterize one or more times in a user schedule based on context information for the parties associated with the user schedules. The time prediction module 304 may be executed by the schedule coordinating device 201, by one or more of the user devices 207, or by a combination of the schedule coordinating device 201 and the one or more user devices 207. As described above, context information may include gatherable information that may be pertinent to predicting a time that is conducive for the completion of a task for the multiple parties associated with the task. For example, context information may include data gathered from the user devices 207 associated with the task, other user devices 207, other electronic devices, and the like. The context information may describe information about the parties, the environment of the parties, and other information that may describe a present or future state of the parties.

When the time prediction module 304 identifies the unscheduled blocks of time in the user schedules, the time prediction module 304 may use the context information to characterize the unscheduled blocks of time, where the characterization indicates the likelihood that the conditions associated with a particular block of time are conducive to the completion of the associated task.

In further embodiments, the task completion module 306 may identify times in the different user schedules for completing a task in response to the characterization by the time prediction module 304. Like the time prediction module 304, the task completion module 306 may be executed by the schedule coordinating device 201 or by one or more of the user devices 207. The task completion module 306 identifies the times for completing a task by identifying the task, identifying one or more parties associated with the task, and identifying conditions related to the completion of the task. Further, the task completion module 306 may monitor the user schedules associated with the one or more parties. Additionally, the task completion module 306 may identify a time in the user schedules where the context information indicates that the conditions related to the completion of the task are likely to exist.

In certain embodiments, the task completion module 306 may identify the task to understand certain characteristics about the task. For example, the task completion module 306 may determine how long the task may take to complete, the location of where the task is to be completed, equipment that may be needed for the completion of the task, and other information related to the completion of the task. In some embodiments, the task completion module 306 may use advanced labeling techniques that enable the classification of tasks based on previously completed tasks. For example, the task completion module 306 may use information generated by learning algorithms to classify a task. For example, the task completion module 306 may use a K nearest neighbor (KNN) learning algorithm along with information gathered from previously completed tasks to classify a present task.

In some embodiments, to use learning algorithms to classify task, the task completion module 306 may gather previous task information from multiple sources. For example, the task completion module 306 may acquire information that describes previously completed tasks by the current party. Also, the task completion module 306 may crowd source information about previously completed tasks from multiple parties. Additionally, applications executing on a particular user device 207 may provide information related to a task that can be used by the task completion module 306 to classify a present task.

When the task completion module 306 acquires the previous task information, the task completion module 306 may execute the learning algorithm to map a present task to a closest set of previously completed tasks. The task completion module 306 may then determine an estimate of completion for the task based on a function of information in the closest set of previously completed tasks. For example, the task completion module 306 may identify the average time of completion for the different tasks in the closest set of previously completed tasks. Other information that may be determined by the task completion module 306 about the closest set of previously completed tasks may include the median completion time, the minimum completion time, the maximum completion time, the variance in the completion time, and the like. The task completion module 306 may also determine other information related to the position of the task from the data in the closest set of previously completed tasks. For example, the task completion module 306 may determine the location of completion, the time when the task should initiate, equipment used to complete the task, and the like. In some embodiments, the task completion module 306 may apply a fudge factor to the estimate of the completion time to increase or decrease the estimate by a certain amount of time. Alternatively, the task completion module 306 may provide the confidence measure for the estimate.

In further embodiments, the task completion module 306 may perform a fine-grained classification. To determine whether or not to perform a fine-grained classification, the task completion module 306 may determine the richness of the data. For example, the task completion module 306 may identify that a task requests that a first party call a second party. Initially, the task may map to a closest set of previously completed tasks that includes previous calls to the second party and the previous calls made to a third party. The task completion module 306 may determine from the data that calls made to the second party are longer than calls made to the third party. Alternatively, the task completion module 306 may determine from the data that calls made to the second party have a different topic than calls made to the third party. From this information, the task completion module 306 may classify the task based on information from calls made to the first party and ignore information from calls made to the third party due to the richness of the data gathered from previous calls to the first and third party.

In certain embodiments, when the task completion module 306 has identified the task, the task completion module 306 may identify the parties associated with the task. For example, where the parties are individuals, the task completion module 306 may identify the names of individuals in a particular task instance. In some implementations, the task completion module 306 may search a task description for names contained in a contact list stored on a particular user device 207, where a task description may refer to information entered in by a party to describe the task. However, the descriptions of individuals within a task description may be ambiguous. For example, a task description may include the first name of an individual and there may be multiple individuals in the contact list having the particular first name. When the task completion module 306 determines that the parties are ambiguously identified in the task description, the task completion module 306 may distinguish a party from the group of parties having the same identifier. For example, the task completion module 306 may use heuristics, task context, past reminders and communications related to the identifier, and the like.

In some embodiments, the task completion module 306 may use heuristics to distinguish an individual in a group of individuals having the same identifier, where the identifier is found in the task description. For example, the task completion module 306 may determine that the individual who was most recently involved in a task should be the individual associated with the task. Alternatively, the task completion module 306 may select an individual most often associated with similar tasks, an individual marked as a preferred individual for the completion of tasks, the number of times an individual has been associated with tasks through other mediums, and the like.

In further embodiments, the task completion module 306 may use task context to distinguish an individual in a group of individuals having the same identifier. The task completion module 306 may review text in the task identifier for indications that further distinguish the party from other parties having the same identifier. For example, text in a task description may state "call Sarah to talk about Mom's birthday." As the text in the task description indicates that Sarah shares a mother with the individual to complete the task, the task completion module 306 may determine that Sarah is a sister of the individual assigned to complete the task. Thus, the task completion module 306 may associate the party identifier with the sister of the individual assigned to complete the task. In an alternative example, text in a task description may state "call Sarah to file taxes." As the text in the test description indicates that Sarah can help file taxes, the task completion module 306 may determine that Sarah has a professional relationship with the individual assigned to complete the task, in particular, that Sarah may be an accountant. Thus, the task completion module 306 may associate the party identifier with the accountant of the individual assigned to complete the task. In a further embodiment, the task completion module 306 may use learning algorithms and crowdsourcing to combine context and classification. For example, the task completion module 306 may augment learning algorithms with social graphs when distinguishing individuals who share a common identifier with multiple parties.

In additional embodiments, the task completion module 306 may determine that an identifier in a task description does not refer to an individual party but rather to a group of individuals. For example, a task description may state "remind the soccer group to bring cupcakes on Thursday." As the identifier "soccer group" fails to refer to any particular party, the task completion module 306 may review previous communications and reminders to determine if the identifier refers to a group of individuals. If the task completion module 306 finds an identifier in previous communications and/or reminders, the task completion module 306 may then identify the parties associated with the identifier and associate the separate individuals with the task. As such, the task completion module 306 may identify parties associated with a task.

In certain embodiments, the task completion module 306 may identify conditions associated with the completion of a task. To identify the conditions associated with the completion of a task the task completion module 306 may find a set of conditions that are true when a party has previously completed a task. From these identified conditions, the task completion module 306 may identify a set of conditions that may likely be true in the future when a task is able to be completed.

When the task completion module 306 identifies the conditions associated with the completion of the task, the task completion module 306 may then review the schedules of the parties associated with the task. Upon reviewing the schedules of the parties associated with the task, the task completion module 306 may identify one or more blocks of time in the user schedules where the context information indicates that the conditions related to the completion of the task are likely to exist. Upon identifying blocks of time in the user schedules were context information indicates that the conditions are likely to exist, the task completion module 306 may schedule a reminder to be provided to one or more of the parties associated with the task during one or more of the identified blocks of time, where the reminder may notify the parties to accomplish the task.

In a further embodiment, when the task completion module 306 identifies the conditions associated with completion of the task, the task completion module 306 may monitor the current conditions of the party. When the current conditions of the party match or sufficiently match the identified conditions associated with completion of the task, the task completion module 306 may provide a reminder to the one or more parties associated with the task to complete the task. As such, the task completion module 306, in combination with the coordination module 302 and the time prediction module 304, may help parties complete tasks by providing reminders to parties at times when conditions of the parties are conducive to the completion of the task.

Figure 4:
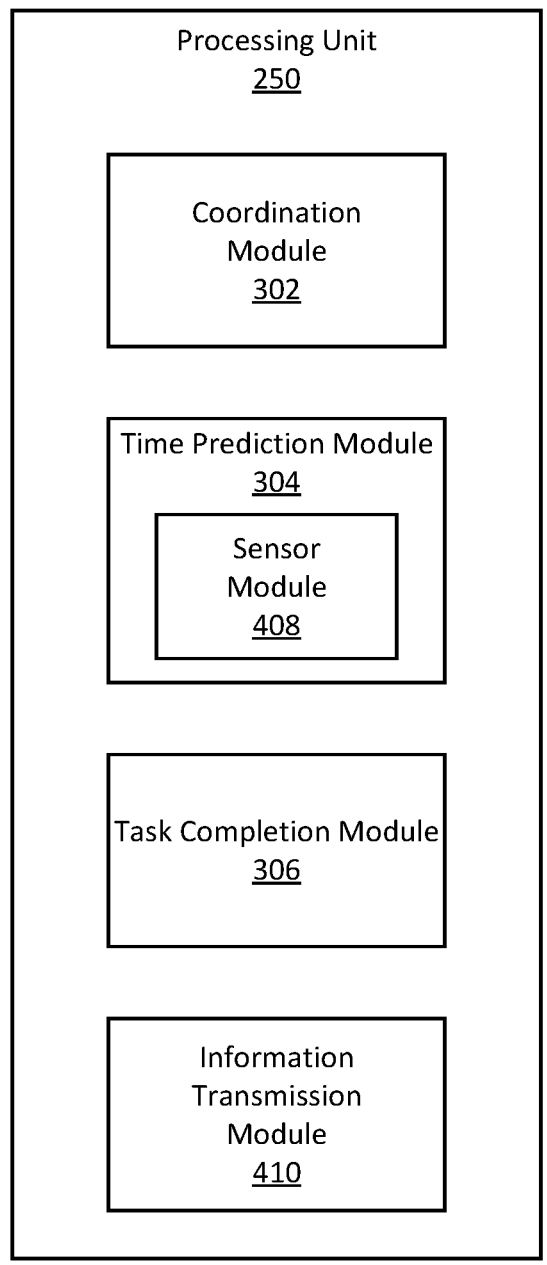
FIG. 4 is a block diagram illustrating a further embodiment of a processor configured to provide opportunistic multi-party reminders based on sensory data.

FIG. 4 is a block diagram illustrating a further embodiment of a processing unit 250 for providing opportunistic multi-party reminders based on sensory data. The processing unit 250, in various embodiments, may be substantially similar to the processing unit 250 described above with regards to FIG. 3. In the depicted embodiment, the processing unit 250 may include a coordination module 302, a time prediction module 304, and a task completion module 306, which may be configured substantially similar as described above with regards to the coordination module 302, the time prediction module 304, and the task completion module 306 of FIG. 3. Additionally, the processing unit 250 may include an information transmission module 410. As described herein, the information transmission module 410 may control the transmission of information related to the user schedules and tasks between different devices. Additionally, the time prediction module 304 may include a sensor module 408. As described herein, the sensor module 408 may sense environmental information associated with parties involved in a task.

In certain embodiments, the information transmission module 410 may communicate information that is related to the user schedules and tasks between different devices that are associated with the parties. For example, the communicated information may include user schedules, context information gathered by a particular device, tasks, times in which a task may be potentially completed, notifications, and other information possibly related to a task, a party, or the completion of the task. In a further example, the information may be communicated between devices that include a user device 207, a sensing device 213, an TOT system 215, a schedule coordinating device 201, or other device related to the completion of a task.

In some embodiments, the information transmission module 410 may communicate the information related to a task to a schedule coordinating device 201 or other type of server device 101 for storage in a central scheduling store, such as the memory unit 205. When the schedule coordinating device 201 receives the information, the schedule coordinating device 201 may use the information to determine when to provide a notification to the parties related to a task and direct the user devices 207 associated with the task to provide a notification to the associated parties. To provide a notification to the parties, the information transmission module 410 may provide a push notification, send an email, send a text message, call the parties, or perform some other operation to notify the party.

In further embodiments, the information transmission module 410 may communicate information related to a task between user devices 207 that are associated with a particular task. For example, the completion of the task may involve a first user device 207-1 and a third user device 207-3. The first user device 207-1 may communicate information acquired by the first user device 207-1 to the third user device 207-3. Likewise, the third user device 207-3 may communicate information acquired by the third user device 207-3 to the first user device 207-1. With this information, the information transmission module 410, along with other modules of the processing unit 250 that are distributed between the first user device 207-1 and the third user device 207-3, may communicate notifications to be displayed by the first user device 207-1 and the third user device 207-3 to the respective parties of the first user device 207-1 and the third user device 207-3.

In additional embodiments, the sensor module 408 may gather context information by sensing environmental information associated with the parties that control the user devices 207. In particular, the sensor module 408 may use the context information gathered by the sensing devices 213 to identify conditions of the environment and the state of the parties that are conducive to the completion of a task. For example, context information gathered by the sensor module 408 may include sensory data, calendar data, explicitly defined party data, and the like.

In certain embodiments, the sensor module 408 may attach context information to tasks when the tasks are completed, such that sensor module 408 may use the attached context information to predict when conditions are conducive for the completion of future tasks that are similar to the previously completed task. For example, a party on a user device 207 may complete a first task. At the time the party indicates that the first task is complete, the sensor module 408 may attach context information that was gathered during a time window associated with the indication of the task completion. For instance, the time window may be a window of time that starts a duration of time before the first task is completed and a duration of time after the first task is completed. Alternatively, the time window may start when a party indicates that the party is initiating a first task and the time window may end when the party indicates that the first task is completed. Alternatively, the sensor module 408 may attach the most recently acquired context information at the moment when a party indicates that the first task is complete.

The sensor module 408 may use the previously attached context information for the first task to predict or determine when conditions, as indicated by gathered context information, are conducive for the completion of a second task that is substantially similar to the first task. For example, the sensor module 408 may predict a time when context information to be gathered by the sensor module 408 will be similar to the saved conditions associated with the first task and schedule a notification at the predicted time. Alternatively, the sensor module 408 may monitor gathered context information and, when the gathered context information becomes similar to the saved conditions associated with the first task, the sensor module 408 may direct a user device 207 to provide a notification to parties associated with the second task.

As stated above, context information may include expressly defined party data. Explicitly define party data may include schedule information that is directly entered by a party when creating a task. A party may define conditions that are conducive to the completion of a task at the time of task creation. A party may define a location where the task would likely be completed, companions associated with the task, companion activities typically completed in association with the task, and the like. Also, context information may include calendar data. Calendar data may include information that is gathered from a scheduling calendar for a particular party. For example, calendar type information may include unscheduled time on the calendar, unavailable time, along with other calendar type information that may be used by the sensor module 408 to determine when a task may be completed.

Further, context information may include sensory data. Sensory data may include data acquired to determine the state of parties and the environment of parties associated with a particular task. Sensory data may be gathered from personal electronic devices, stationary sensors, TOT systems, and the like. Personal electronic devices may include devices that are associated with a particular party to a task. The type of sensory data that is acquirable from a personal electronic device may include imagery captured by a camera, audio information acquired from microphones, biometric feedback, moods entered by a party, location of the personal electronic device, party context, time, inertial information acquired from gyroscopes and accelerometers, and the like. Stationary sensors, such as the sensing device 213, that are not explicitly associated with any particular party, but are more generally associated with an area, may also provide sensory data. Sensory data acquired from stationary sensors may include data gathered from services, such as Amazon Alexa and Google Home, alarm systems, fixed cameras, microphones, and the like. Further, TOT systems, such as the TOT system 215 may also provide context information that may indicate information about the current state of a party. For example, TOT systems 215 may include smart cars, smart appliances, smart rooms, and the like. In some embodiments, the provided context information may be fairly high level, such as a raw GPS reading. Alternatively, the provided context information may be specific, such as the party is shopping in a grocery store or driving in a car along a specified street.

As described above, the sensor module 408 may gather context information from multiple sources to determine the present and/or expected state of a party. The time prediction module 304 may then use the context information to schedule a reminder when the state of the party is expected to be conducive for the completion of the task or provide a reminder when the monitored conditions indicate that current conditions may be conducive for the completion of the task. As such, the functioning of the processing unit 250 having the sensor module 408 and the information transmission module 410 may help a party complete their tasks.

Figure 5:
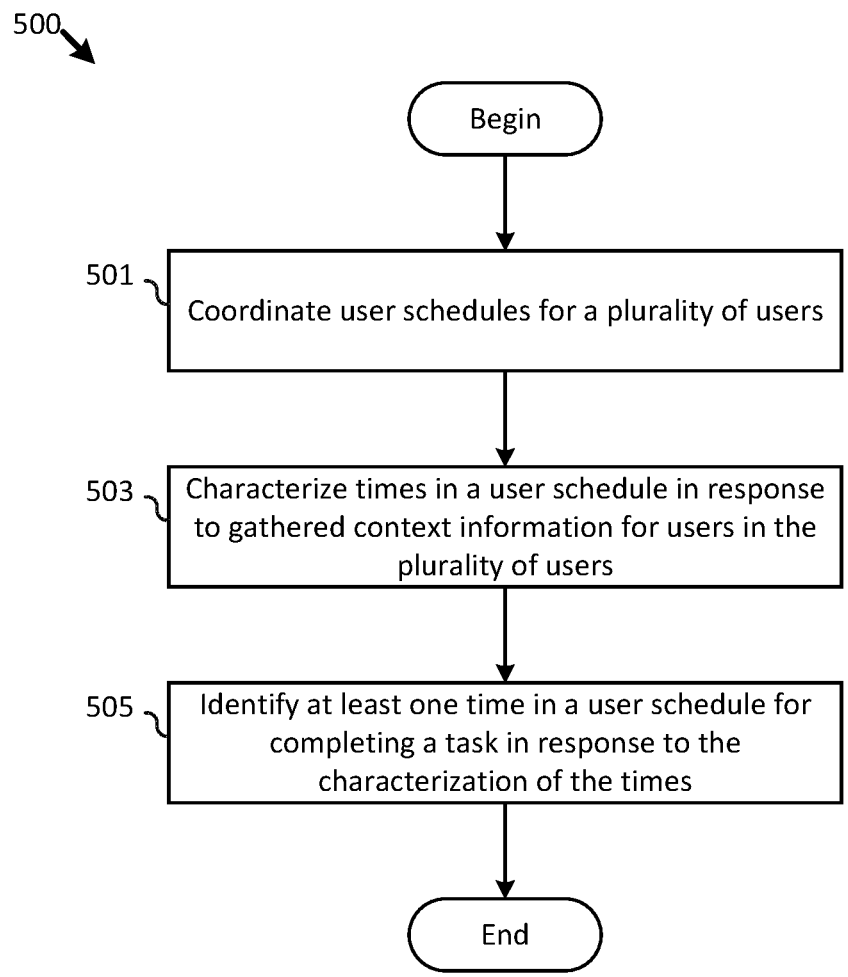
FIG. 5 is a flowchart diagram illustrating one embodiment of a method for providing opportunistic multi-party reminders based on sensory data.

FIG. 5 is a flowchart diagram illustrating one embodiment of a method 500 for providing opportunistic multi-party reminders based on sensory data. Method 500 begins at 501, where user schedules are coordinated for a plurality of parties. Method 500 proceeds at 503, where times in a user schedule are characterized in response to gathered context information for parties in the plurality of parties. Method 500 then proceeds at 505, where at least one time in a user schedule is identified for completing a task in response to the characterization of the times. Method 500 then ends.

Figure 6:
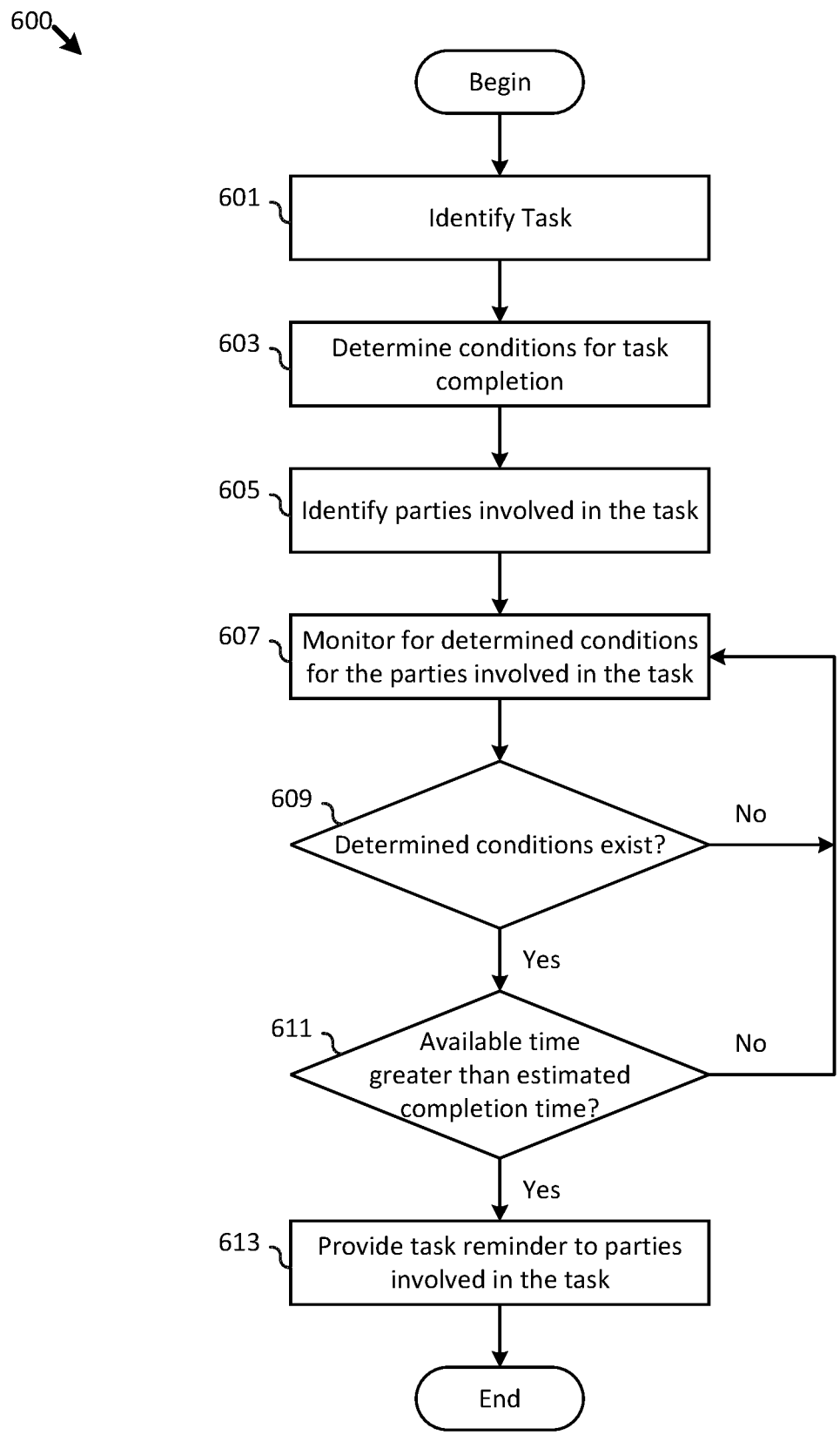
FIG. 6 is a flowchart diagram illustrating an embodiment of a further method for providing opportunistic multi-party reminders based on sensory data.

FIG. 6 is a flowchart diagram illustrating one embodiment of a further method 600 for providing opportunistic multi-party reminders based on sensory data. Method 600 proceeds at 601, where a task is identified. For example, a task may be identified substantively as described above with respect to the task completion module 306. When the task is identified, the method 600 may proceed at 603, where conditions for task completion are determined. As described above, the task completion module 306 may review previously completed tasks to identify the conditions that are conducive to the completion of a task. When the conditions for task completion are determined, the method 600 proceeds at 605, where the parties involved in the task are identified. For example, the task completion module 306 may identify the parties associated with a task from a task description.

In certain embodiments, the method 600 proceeds at 607, where determined conditions are monitored for the parties involved in the task. For example, the task completion module 306 may monitor sensory data provided by the sensor module 408 to identify times at which the determined conditions may occur. In particular, the monitored conditions may indicate the activities of parties associated with the user devices 207. As used herein, a party activity may be an activity done by a party associated with a task. Many party activities have characteristics that can be monitored by a user device 207, such that the user device 207 and other devices can generate context information describing a present state of a party. For example, a user device 207 and other devices may determine when a user is talking to an individual, sleeping, traveling in a car, exercising, and the like. The task completion 306 may monitor the party activities and associated context information to identify when the determined conditions may occur.

In further embodiments, the method 600 may proceed at 609 where it is determined whether or not the determined conditions exist for the completion of the task. If the determined conditions do not exist, the method 600 returns to 607, where the method 600 continues to monitor for the determined conditions. However, if the method 600 determines that conditions conducive for the completion of the task exist, the method 600 may proceed at 611, where the method 600 determines whether the available time for the completion of the task is greater than an estimated completion time. If the method 600 determines that the available time is less than the estimated completion time, the method 600 returns to 607, where the method 600 continues to monitor for the determined conditions. However, if the available time is greater than the estimated completion time, the method 600 proceeds at 613, where a task reminder is provided to the parties involved in the task. For example, the method 600 has determined that the multiple parties associated with the task are able to complete the task at the time. Thus, the method 600 provides a reminder to complete the task and the method 600 ends.

Figure 7:
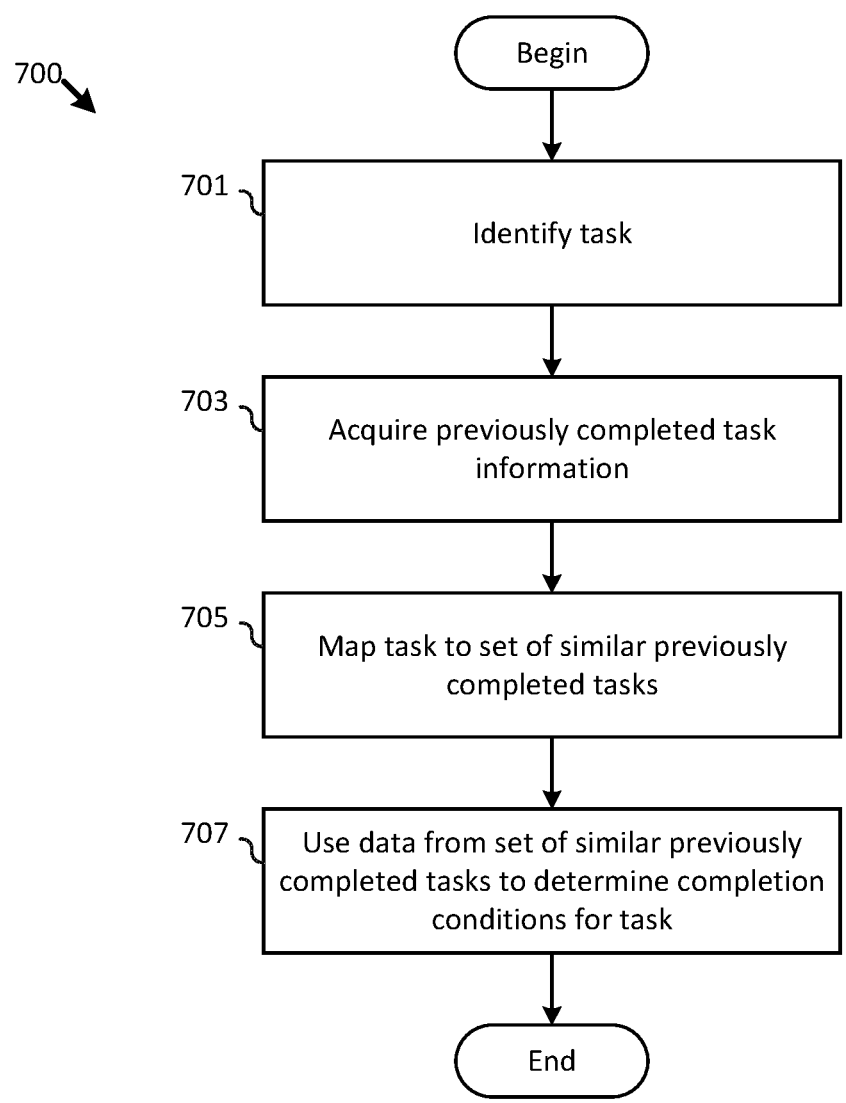
FIG. 7 is a flowchart diagram illustrating one embodiment of a method for identifying task completion conditions when providing opportunistic multi-party reminders based on sensory data.

FIG. 7 is a flowchart diagram illustrating one embodiment of a method 700 for identifying task completion conditions when providing opportunistic multi-party reminders based on sensory data. Method 700 begins at 701 where a task is identified. Method 700 proceeds at 703 where previously completed task information is acquired. For example, the method 700 may acquire previously completed task information from a user device 207 that schedules the task, an application associated with the completion of the task, and crowd sourced information associated with the completion of similar tasks by other parties. When the method 700 has acquired previously completed task information, the method 700 proceeds at 705 where a task is mapped to a set of similar previously completed tasks. Further, the method 700 proceeds at 707 where data is used from a set of similar previously completed tasks to determine completion conditions for the task. When the completion conditions are determined for a particular task, the method 700 ends.

Figure 8:
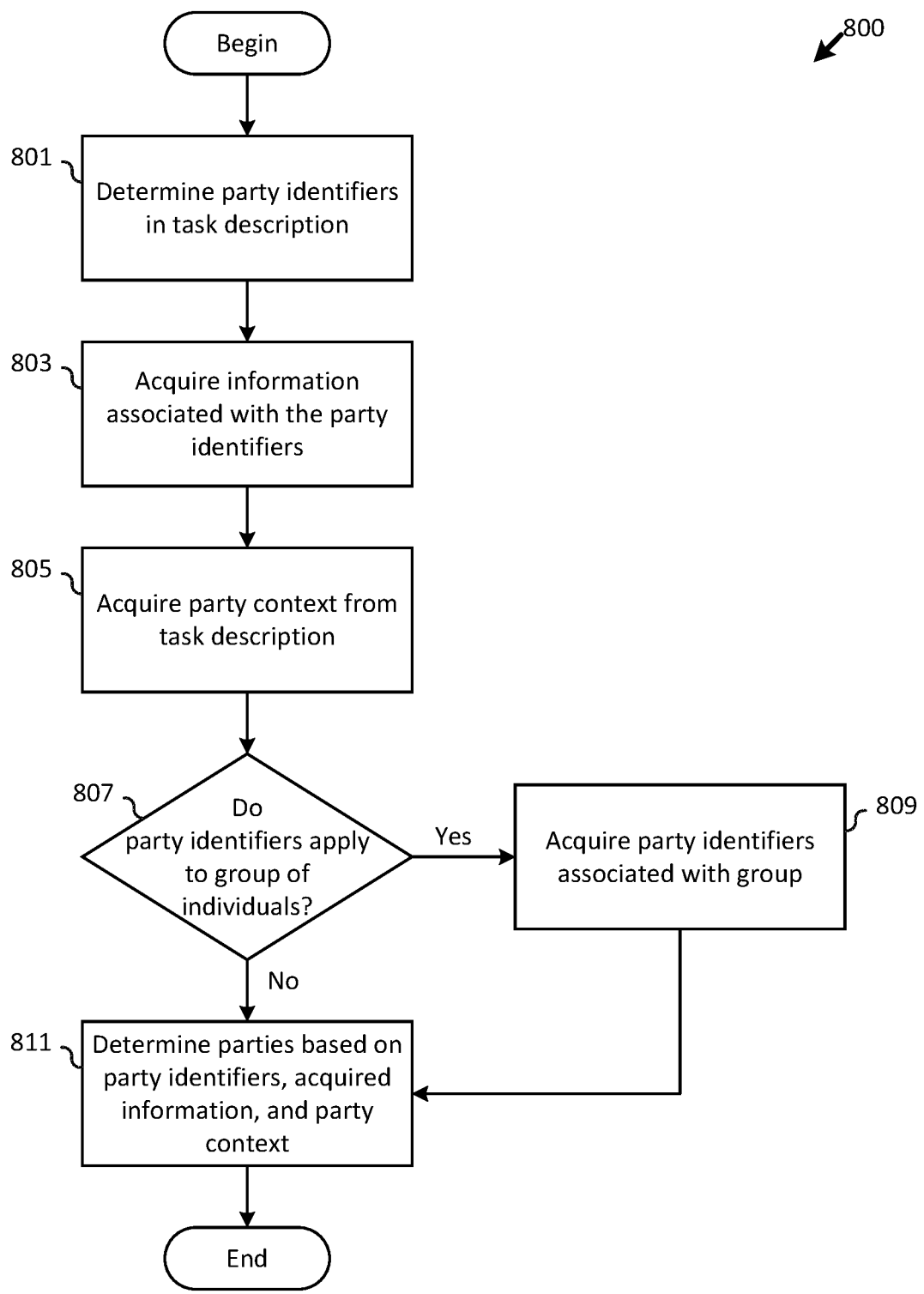
FIG. 8 is a flowchart diagram illustrating one embodiment of a method for identifying task parties when providing opportunistic multi-party reminders based on sensory data.

FIG. 8 is a flowchart diagram illustrating one embodiment of a method 800 for identifying task parties when providing opportunistic multi-party reminders based on sensory data. Method 800 begins and proceeds at 801 where party identifiers are determined in a task description. For example, the parties or parties that are associated with the task may be identified by reviewing the task description. When the parties associated with the task are identified, the method proceeds at 803, where information associated with the party identifiers is acquired. For example, information associated with the party identifiers may include contact information for the identifiers stored on a user device 207. Further, when the information associated with the party identifiers is acquired, the method 800 may proceed at 805, where party context is acquired from task description. As described above, a task description may include information that further identifies a party, from this further information, ambiguous identifiers may be clarified.

When the method 800 has acquired context information from the task description, the method 800 proceeds at 807, where the method determines whether the determined party identifiers apply to a group of individuals. If the method 800 determines that the party identifiers do not apply to a group of individuals, the method 800 proceeds at 811, where parties are determined based on the party identifiers, the acquired information and the party context. Alternatively, if the method determines that the party identifiers do apply to a group of individuals, the method 800 proceeds at 809 where party identifiers associated with the group are acquired. For example, a party identifier may be a group identifier associated with multiple separate parties. The parties may then be set to the party identifiers that are associated with the group identifier. When the party identifiers have been set to the party identifiers associated with the group identifier, the method 800 may then proceed at 811, where parties are determined based on the party identifiers, the acquired information, and the party context. When the method 800 has identified the parties associated with a particular task, method 800 ends.

Figure 9:
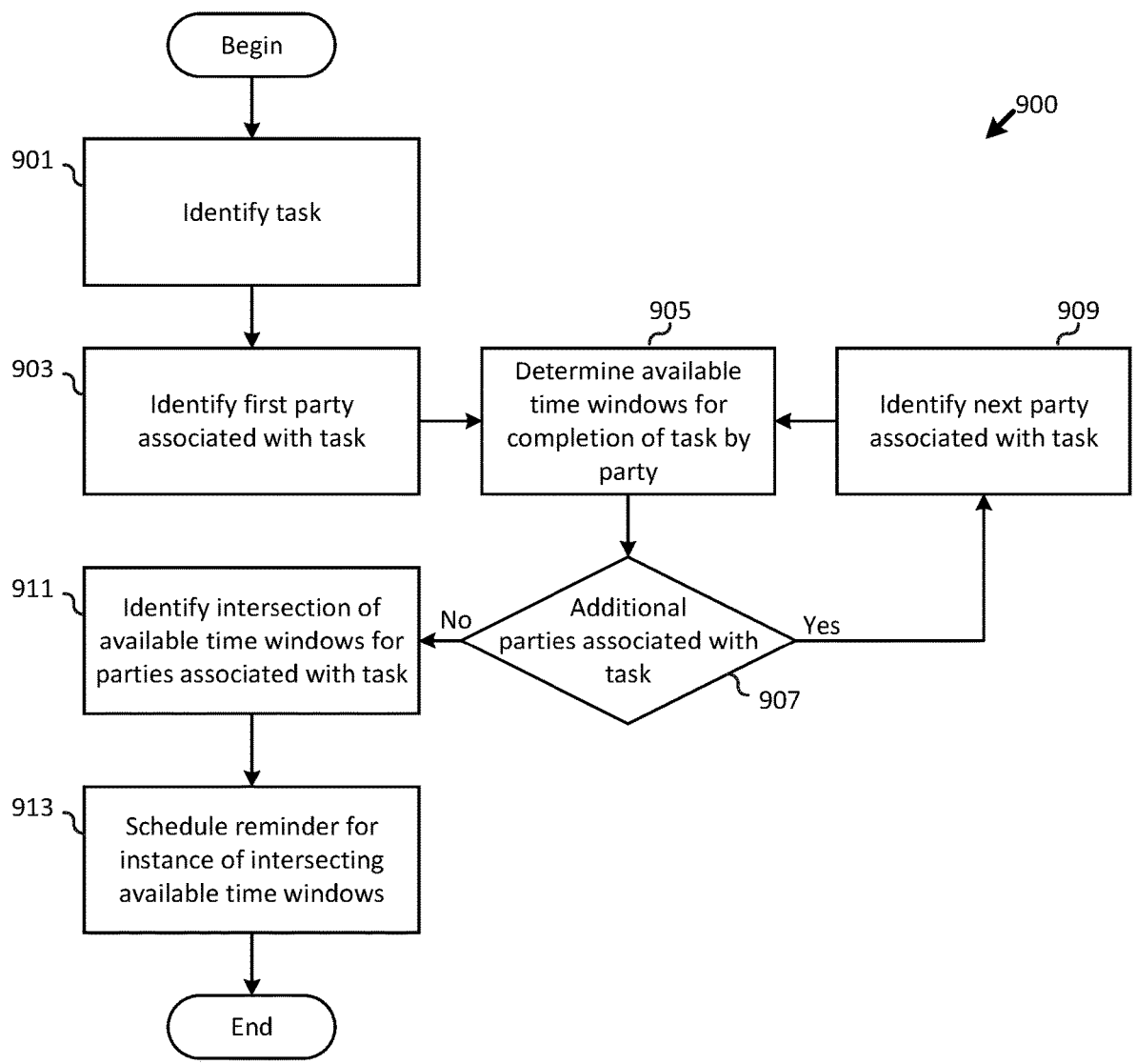
FIG. 9 is a flowchart diagram illustrating one embodiment of a method for scheduling task reminders when providing opportunistic multi-party reminders based on sensory data.

FIG. 9 is a flowchart diagram illustrating one embodiment of a method 900 for scheduling task reminders when providing opportunistic multi-party reminders based on sensory data. Method 900 begins and proceeds at 901, where a task is identified. Method 900 then proceeds to 903, where a first party associated with a task is identified. When the method 900 identifies the first party associated with the task, the method 900 may proceed at 905, where available time windows for completion of task by the respective party are determined. When the time windows for the respective party are determined, the method 900 proceeds at 907, where the method 900 determines whether there are additional parties associated with the task. If there are additional parties associated with the task, the method 900 proceeds at 909, where a next party associated with the task is identified.

In certain embodiments, when the next party is identified, the method 900 returns to 905, where available time windows are determined for the next party associated with the task. When a sufficient number of available time windows have been identified for the parties associated with the task, the method 900 proceeds at 911, where an intersection of available time windows is identified for the parties associated with the task. For example, to identify an intersection of available time windows for multiple parties, the computing system 200 may attempt to find a time that is not scheduled on the devices associated with the identified parties. Also, the computing system 200 may weigh the schedules of the identified parties, such that the intersections of available times is determined for a subset of the identified parties. If the computing system 200 is unable to find an intersection of the available time windows, the computing system 200 may provide a hard-time fallback or use a time indicated by one of the parties. When the intersection of available time windows is identified for the multiple parties, the method 900 proceeds at 913, where a reminder for an instance of intersecting available time windows is scheduled. Alternatively, instead of a reminder, the computing system 200 may perform a different action such as initiate a conference call for the different parties, or other action. When the reminder is scheduled, method 900 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
a processor configured to receive, from a set of sensing devices, environmental data including information about one or more current environmental conditions of an environment within which one or more users of a plurality of users currently resides, wherein:
the one or more current environmental conditions of the environment are conducive for completing a shared task involving two or more users of the plurality of users,
a first user of the two or more users is responsible for at least a first portion of the shared task, and
a second user of the two or more users is responsible for at least a second portion of the shared task;
a coordination module that, in response to the one or more current environmental conditions of the environment being conducive for completing the shared task, coordinates user schedules for at least the first user and the second user for completing the shared task;
a time prediction module that predicts an availability of one or more times in the user schedules for the first user and the second user for completing the shared task while the one or more current environmental conditions of the environment remain conducive for completing the shared task, wherein:
the prediction is based on an expected duration of time for completing the shared task,
each of the one or more times of predicted availability is identified as being first non-scheduled periods of time for the first user and second non-scheduled periods of time for at least the second user,
each first non-scheduled period of time corresponds to and coincides with a respective second non-scheduled period of time,
each first non-scheduled period of time and each second non-scheduled period of time includes an amount of time that is greater than or equal to the expected duration of time for completing the shared task, and
the one or more users currently residing in the environment is one of the two or more users involved in the shared task; and
a task completion module that identifies at least one time in the one or more times of predicted availability in the user schedules for each of the two or more users of the plurality of users for completing the shared task based on the information about the one or more current environmental conditions of the environment within which the one or more users currently resides included in the environmental data received from the set of sensing devices, wherein:
the one or more current environmental conditions of the environment that are conducive for completing the shared task are identified as being a same one or more environmental conditions as one or more previous environmental conditions that were present at a previous time when one or more previous instances of the shared task were previously completed, and
at least a portion of each of said modules comprises one or more of a set of hardware circuits, a set of programmable hardware devices, and a set of non-transitory computer-readable storage media storing executable code defining said modules.

2. The system of claim 1, further comprising an information transmission module that controls transmission of the user schedules, the environmental data including the information about the one or more current environmental conditions of the environment, and the one or more times of predicted availability.

3. The system of claim 2, wherein the information transmission module transmits the information about the one or more current environmental conditions of the environment from at least one user device of the two or more users to at least one of:
a central scheduling store; and
a peer device.

4. The system of claim 1, wherein:
the processor comprises a sensor module that gathers, in real-time, the information about the one or more current environmental conditions of the environment from the set of sensing devices;
the set of sensing devices is located on at least one user device of the first user and the second user;
the set of sensing devices detect, in real-time, the one or more current environmental conditions of the environment that are conducive for completing the shared task; and
the time prediction module predicts, in real-time, the availability of the one or more times in the user schedules for the first user and the second user for completing the shared task while the one or more current environmental conditions of the environment remain conducive for completing the shared task as sensed in real-time by the set of sensing devices.

5. The system of claim 1, wherein the task completion module identifies the at least one time for completing the shared task by:
monitoring one or more user activities and the information about the one or more current environmental conditions of the environment; and
determining that the one or more user activities and the information about the one or more current environmental conditions of the environment indicate the at least one time for completing the shared task.

6. The system of claim 1, wherein the task completion module identifies the at least one time for completing the shared task by:
identifying the shared task;
identifying the two or more users associated with the shared task;
identifying one or more environmental conditions related to the completion of the shared task;
monitor the user schedules associated with the two or more users; and
identifying the at least one time in the user schedules in which the information about the one or more current environmental conditions of the environment indicates that the one or more environmental conditions related to the completion of the shared task are likely to exist.

7. The system of claim 6, wherein identifying the shared task comprises at least one of:
determining a duration of the shared task; and
classifying the shared task based on previously completed tasks.

8. The system of claim 6, wherein identifying the two or more users associated with the shared task comprises at least one of:
determining a user identifier in a task description of the shared task; and
in response to the user identifier applying to multiple users, determining a user of the two or more users based on other recorded task information.

9. The system of claim 6, wherein identifying the one or more environmental conditions comprises:
identifying previously completed tasks that are similar to the shared task;
analyzing sensory data that is associated with the previously completed tasks; and
identifying the one or more environmental conditions that are associated with the sensory data.

10. A method, comprising:
receiving, by a processor from a set of sensing devices, environmental data including information about one or more current environmental conditions of an environment within which one or more users of a plurality of users currently resides, wherein:
the one or more current environmental conditions of the environment are conducive for completing a shared task involving two or more users of the plurality of users,
a first user of the two or more users is responsible for at least a first portion of the shared task, and
a second user of the two or more users is responsible for at least a second portion of the shared task;
coordinating user schedules for at least the first user and the second user for completing the shared task in response to the one or more current environmental conditions of the environment being conducive for completing the shared task;
predicting one or more times in the user schedules for the first user and the second user for completing the shared task while the one or more current environmental conditions of the environment remain conducive for completing the shared task, wherein:
the prediction is based on an expected duration of time for completing the shared task,
each of the one or more times of predicted availability is identified as being first non-scheduled periods of time for the first user and second non-scheduled periods of time for at least the second user,
each first non-scheduled period of time corresponds to and coincides with a respective second non-scheduled period of time,
each first non-scheduled period of time and each second non-scheduled period of time includes an amount of time that is greater than or equal to the expected duration of time for completing the shared task, and
the one or more users currently residing in the environment is one of the two or more users involved in the shared task; and
identifying at least one time in the one or more times of predicted availability in the user schedules for each of the two or more users of the plurality of users for completing the shared task based on the information about the one or more current environmental conditions of the environment within which the one or more users currently resides included in the environmental data received from the set of sensing devices, wherein the one or more current environmental conditions of the environment that are conducive for completing the shared task are identified as being a same one or more environmental conditions as one or more previous environmental conditions that were present at a previous time when one or more previous instances of the shared task were previously completed.

11. The method of claim 10, further comprising controlling transmission of the user schedules, the environmental data including the information about the one or more current environmental conditions of the environment, and the one or more times of predicted availability.

12. The method of claim 11, further comprising transmitting the information about the one or more current environmental conditions of the environment from at least one user device of the two or more users to at least one of:
   a central scheduling store; and
   a peer device.

13. The method of claim 10, further comprising gathering the information about the one or more current environmental conditions of the environment from at least one user device of the two or more users.

14. The method of claim 10, wherein identifying the at least one time for completing the shared task comprises:
   monitoring one or more user activities and the information about the one or more current environmental conditions of the environment; and
   determining that the one or more user activities and the information about the one or more current environmental conditions of the environment indicate the at least one time for completing the shared task.

15. The method of claim 10, wherein identifying the at least one time for completing the shared task comprises:
   identifying the shared task;
   identifying the two or more users associated with the shared task;
   identifying one or more environmental conditions related to the completion of the shared task;
   monitoring the user schedules associated with the two or more users; and
   identifying the at least one time in the user schedules in which the information about the one or more current environmental conditions of the environment indicates that the one or more environmental conditions related to the completion of the shared task are likely to exist.

16. The method of claim 15, wherein identifying the shared task comprises at least one of:
   determining a duration of the shared task; and
   classifying the shared task based on previously completed tasks.

17. The method of claim 15, wherein identifying the two or more users associated with the shared task comprises at least one of:
   determining an identifier in a task description for the shared task; and
   in response to the user identifier applying to multiple users, determining a user of the two or more users based on other recorded task information.

18. The method of claim 15, wherein identifying the one or more environmental conditions comprises:
   identifying previously completed tasks that are similar to the shared task;
   analyzing sensory data that is associated with the previously completed tasks; and
   identifying the one or more environmental conditions that are associated with the sensory data.

19. A computer program product comprising a non-transitory computer-readable storage medium including program instructions embodied therewith, the program instructions executable by a processor to cause the processor to:
   receive, from a set of sensing devices, environmental data including information about one or more current environmental conditions of an environment within which one or more users of a plurality of users currently resides, wherein:
      the one or more current environmental conditions of the environment are conducive for completing a shared task involving two or more users of the plurality of users,
      a first user of the two or more users is responsible for at least a first portion of the shared task, and
      a second user of the two or more users is responsible for at least a second portion of the shared task;
   coordinate user schedules for at least the first user and the second user for completing the shared task in response to the one or more current environmental conditions of the environment being conducive for completing the shared task;
   predict one or more times in the user schedules for the first user and the second user for completing the shared task while the one or more current environmental conditions of the environment remain conducive for completing the shared task, wherein:
      the prediction is based on an expected duration of time for completing the shared task,
      each of the one or more times of predicted availability is identified as being first non-scheduled periods of time for the first user and second non-scheduled periods of time for at least the second user,
      each first non-scheduled period of time corresponds to and coincides with a respective second non-scheduled period of time,
      each first non-scheduled period of time and each second non-scheduled period of time includes an amount of time that is greater than or equal to the expected duration of time for completing the shared task, and
      the one or more users currently residing in the environment is one of the two or more users involved in the shared task; and
   identify at least one time in the one or more times of predicted availability in the user schedules for each of the two or more users of the plurality of users for completing the shared task based on the information about the one or more current environmental conditions of the environment within which the one or more users currently resides included in the environmental data received from the set of sensing devices,
   wherein the one or more current environmental conditions of the environment that are conducive for completing the shared task are identified as being a same one or more environmental conditions as one or more previous environmental conditions that were present at a previous time when one or more previous instances of the shared task were previously completed.

20. The computer program product of claim 19, wherein the program instructions further cause the processor to:

gather the information about the one or more current environmental conditions of the environment from at least one user device of the two or more users.

\* \* \* \* \*